(12) United States Patent
Ledden et al.

(10) Patent No.: US 11,851,011 B2
(45) Date of Patent: Dec. 26, 2023

(54) SYSTEMS AND METHODS FOR AUTOMATICALLY AND INTELLIGENTLY REDUCING THE POWER CONSUMPTION OF DEVICES

(71) Applicant: Brunswick Corporation, Mettawa, IL (US)

(72) Inventors: John T. Ledden, Edgewater, FL (US); Robert P. Macias, Merritt Island, FL (US)

(73) Assignee: Brunswick Corporation, Mettawa, IL (US)

( * ) Notice: Subject to any disclaimer, the term of this patent is extended or adjusted under 35 U.S.C. 154(b) by 316 days.

(21) Appl. No.: 17/009,412

(22) Filed: Sep. 1, 2020

(65) Prior Publication Data

US 2022/0063526 A1 Mar. 3, 2022

(51) Int. Cl.
*B60R 16/03* (2006.01)
*B63J 99/00* (2009.01)

(52) U.S. Cl.
CPC ............... *B60R 16/03* (2013.01); *B63J 99/00* (2013.01)

(58) Field of Classification Search
None
See application file for complete search history.

(56) References Cited

U.S. PATENT DOCUMENTS

| | | |
|---|---|---|
| 6,342,775 B1 | 1/2002 | Sleder, Sr. |
| 6,652,330 B1 | 11/2003 | Wasilewski |
| 7,218,118 B1 | 5/2007 | Gonring |
| 8,043,132 B1 | 10/2011 | Wyant |
| 8,608,521 B1 | 12/2013 | Snyder et al. |
| 8,725,329 B1 | 5/2014 | Snyder et al. |
| 8,836,544 B1 | 9/2014 | Balogh |
| 9,054,555 B1 | 6/2015 | Ward |
| 9,362,838 B1 | 6/2016 | Balogh et al. |
| 9,533,747 B2 | 1/2017 | Arbuckle et al. |
| 9,739,624 B2 | 8/2017 | Rajagopalan et al. |
| 10,295,355 B2 | 5/2019 | Baglino et al. |
| 10,573,098 B2 | 2/2020 | Mash |

(Continued)

OTHER PUBLICATIONS

Extended European Search Report for European Application No. 21192554.0 dated Jan. 20, 2022.

*Primary Examiner* — Rexford N Barnie
*Assistant Examiner* — Terrence R Willoughby
(74) *Attorney, Agent, or Firm* — ANDRUS INTELLECTUAL PROPERTY LAW, LLP

(57) ABSTRACT

A method for automatically reducing the power consumed by devices from a power source having a limited amount of power. The method includes determining with a control system which of the devices is consuming the power. The method further includes identifying a candidate device among the devices to tentatively control to reduce the power consumed by the candidate device. The method further includes accessing a power control model, where the power control model includes pairings of the candidate device with complementary devices among the devices, and where the devices in each of the pairings consume the power in a related pattern. The method further includes controlling the candidate device to reduce the power consumed thereby only when each of the complementary devices in each of the pairings in the power control model are determined to be in a non-power consuming state.

20 Claims, 4 Drawing Sheets

(56) References Cited

U.S. PATENT DOCUMENTS

| | | |
|---|---|---|
| 2011/0138198 A1 | 6/2011 | Boss et al. |
| 2012/0065798 A1* | 3/2012 | Finch ............... H02J 3/144 |
| | | 700/295 |
| 2017/0176195 A1 | 6/2017 | Rajagopalan et al. |
| 2019/0024918 A1* | 1/2019 | Brissette .............. H05B 47/115 |

* cited by examiner

SYSTEMS AND METHODS FOR
AUTOMATICALLY AND INTELLIGENTLY
REDUCING THE POWER CONSUMPTION
OF DEVICES

FIELD

The present disclosure generally relates to systems and methods for automatically and intelligently reducing the power consumption of devices, particularly the consumption from a power source having a limited amount of power.

BACKGROUND

U.S. Pat. No. 6,652,330 discloses a method for controlling the electrical system of a marine vessel that comprises the steps of measuring a battery potential, comparing the battery potential to a threshold voltage magnitude, and then disconnecting one or more of a plurality of electrical power consuming devices when the voltage potential is less than the threshold voltage magnitude. This is done to avoid the deleterious condition wherein an engine of the marine vessel is operating at idle speed and attempting to charge the battery while a plurality of electrical power consuming devices are operating and drawing sufficient current from the alternator to prevent the proper charging of the battery. In these circumstances, the battery potential can actually be depleted as the battery attempts to provide the additional required electrical current for the loads.

U.S. Pat. No. 6,342,775 discloses a battery switching circuit that provides a mechanism by which a plurality of electrical storage batteries can be alternatively connected in parallel or series based on the position of a manually controlled joystick of a marine positioning and maneuvering system. When the joystick is in a neutral position in which no docking motion is demanded by the marine vessel operator, the storage batteries are connected in parallel so that they can benefit from charging by an alternator or generator associated with an internal combustion engine. If the joystick is moved out of its neutral position, the batteries are immediately connected in series to provide power to a plurality of electric motors that are used to drive a plurality of impellers of the docking system.

U.S. Pat. No. 9,533,747 discloses a hybrid propulsion system that has an internal combustion engine and an electric motor that each selectively powers a marine propulsor to propel a marine vessel. A plurality of batteries discharges current to power the motor. A controller is programmed to aggregate the recharge and/or discharge limits of plurality of batteries and then operate the system according to a method that preferably prevents internal fault and disconnection of batteries in the plurality.

U.S. Pat. No. 7,218,118 discloses a method for monitoring the condition of a battery of a marine propulsion system that provides the measuring of a voltage characteristic of the battery, comparing the voltage characteristic to a preselected threshold value, and evaluating the condition of the battery as a function of the relative magnitudes of the voltage characteristic and the threshold value. The voltage characteristic of the battery is measured subsequent to a connection event when a connection relationship between the battery and an electrical load is changed. The electrical load is typically a starter motor which is connected in torque transmitting relation with an internal combustion engine. The voltage characteristic is preferably measured at its minimum value during the inrush current episode immediately prior to cranking the internal combustion engine shaft to start the engine.

The above-noted patents and applications are hereby incorporated by reference herein, in their entireties.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

One embodiment of the present disclosure generally relates to a method for automatically reducing the power consumed by devices from a power source having a limited amount of power. The method includes determining with a control system which of the devices is consuming the power. The method further includes identifying a candidate device among the devices to tentatively control to reduce the power consumed by the candidate device. The method further includes accessing a power control model, where the power control model includes pairings of the candidate device with complementary devices among the devices, and where the devices in each of the pairings consume the power in a related pattern. The method further includes controlling the candidate device to reduce the power consumed thereby only when each of the complementary devices in each of the pairings in the power control model are determined to be in a non-power consuming state.

Another embodiment generally relates to a system for automatically reducing power consumption of devices from a power source having a limited amount of power. The includes a memory system storing a power control model and a control system configured to: determine which of the devices is consuming the power; identify a candidate device among the devices to tentatively control to reduce the power consumed by the candidate device; access the power control model, where the power control model includes pairings of the candidate device with complementary devices among the devices, and where the devices in each of the pairings consume the power in a related pattern; and control the candidate device to reduce the power that the candidate device consumes. The control system is configured to control the candidate device to reduce the power consumed thereby only when each of the complementary devices in each of the pairings in the power control model are determined to be off.

Another embodiment generally relates to a method for automatically reducing the power consumed by devices from a power source having a limited amount of power. The method includes: (a) determining with a control system which of the devices is consuming the power; (b) identify a candidate device from a candidate list of the devices to tentatively control to reduce the power consumed by the candidate device; (c) accessing a power control model, where the power control model includes pairings of the candidate device with complementary devices among the devices, where the devices in each of the pairings consume the power in a related pattern, and where the related patterns in the power control model include combinations of the devices that consume the power simultaneously; (d) controlling the candidate device to reduce the power consumed thereby only when each of the complementary devices in each of the pairings in the power control model are determined to be in a non-power consuming state; and (e)

assigning another of the devices on the candidate list as the candidate device and repeating steps (a-e) until the all of the devices on the candidate have been assigned as the candidate device.

Various other features, objects and advantages of the disclosure will be made apparent from the following description taken together with the drawings.

BRIEF DESCRIPTION OF THE DRAWINGS

The present disclosure is described with reference to the following Figures. The same numbers are used throughout the Figures to reference like features and like components.

DETAILED DESCRIPTION

In the present description, certain terms have been used for brevity, clarity, and understanding. No unnecessary limitations are to be implied therefrom beyond the requirement of the prior art because such terms are used for descriptive purposes only and are intended to be broadly construed. The different systems and methods described herein may be used alone or in combination with other systems and methods. Various equivalents, alternatives, and modifications are possible.

Figure 1:
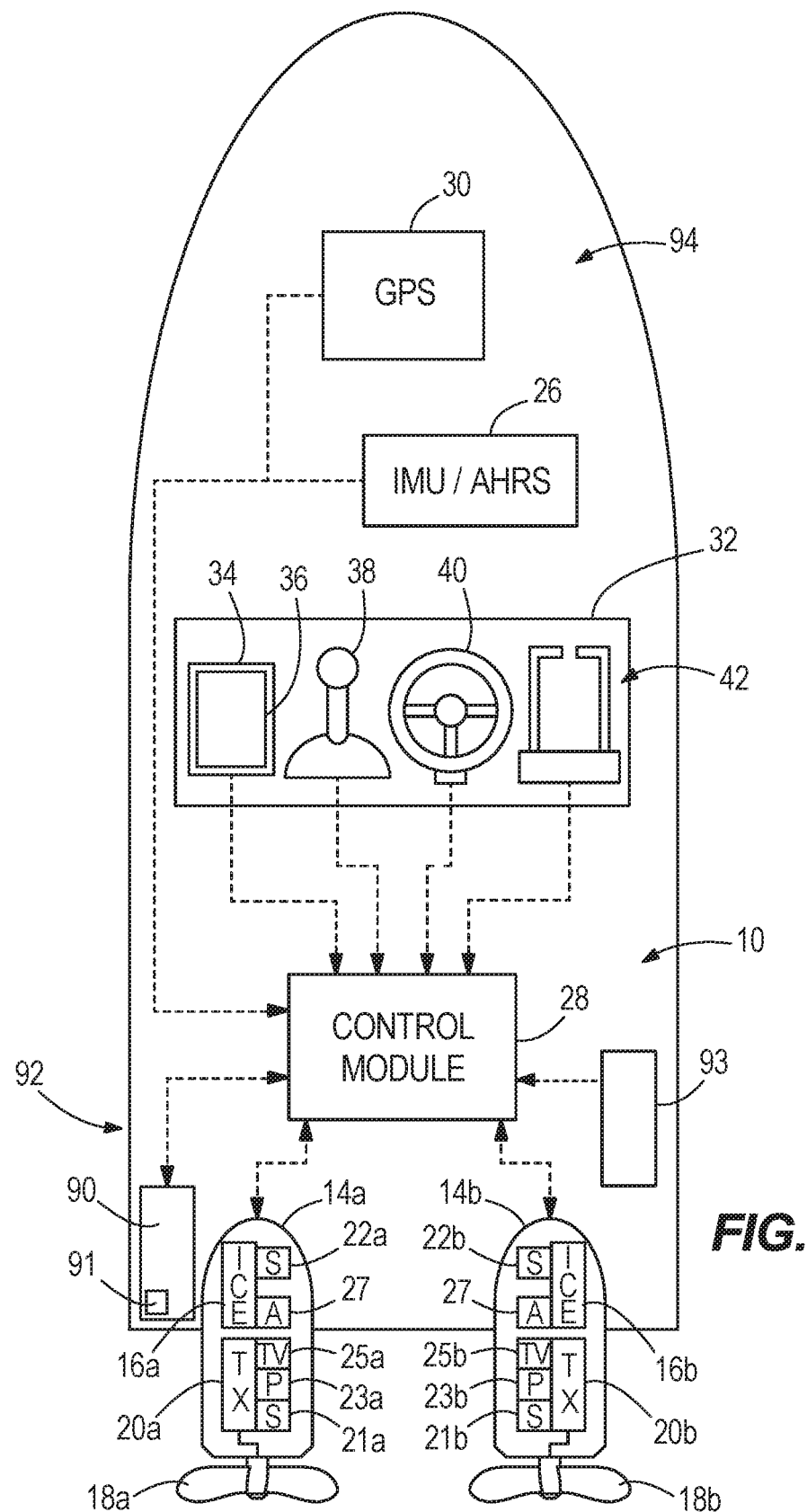
FIG. 1 depicts an exemplary marine vessel including a system for automatically reducing power consumption of devices according to the present disclosure.

FIG. 1 illustrates a marine propulsion system 10 for a marine vessel 12. The marine propulsion system 10 includes two marine propulsion devices 14a, 14b, but one or more than two marine propulsion devices could instead be provided. The marine propulsion devices 14a, 14b shown herein are outboard motors, but the marine propulsion devices could instead be inboard motors, stern drives, pod drives, jet drives, etc. Each marine propulsion device 14a, 14b includes an engine 16a or 16b. The engines 16a, 16b shown here are internal combustion engines, which may be, for example, gasoline or diesel engines. Each marine propulsion device 14a, 14b also includes a propeller 18a or 18b configured to be coupled in torque-transmitting relationship with a respective engine 16a or 16b. Such torque-transmitting relationship is more specifically provided by way of a transmission 20a or 20b configured to transmit torque from a respective engine 16a or 16b to a respective propeller 18a or 18b. Each transmission 20a, 20b is configured to transmit torque from the engine 16a or 16b to the propeller 18a or 18b at one of at least a first gear ratio and a second gear ratio, although additional gear ratios such as, for example, third, fourth, fifth, etc. gear ratios could be provided. Alternatively, only a single forward gear ratio may be provided.

The marine propulsion system 10 further includes engine speed sensors 22a, 22b measuring a speed of a respective engine 16a, 16b. In one example, the engine speed sensors 22a, 22b may be shaft rotational speed sensors (e.g., tachometers), which measure a speed of the engine 16a or 16b in rotations per minute (RPM), as is known to those having ordinary skill in the art. The engine speed is also referenced to as a transmission input speed, as the input shaft of a transmission in certain embodiments is coupled to rotate directly therewith. Each transmission 20a, 20b includes a transmission output speed (TOS) sensor 21a, 21b that measures a transmission output speed of the respective transmission 20a, 20b in RPM. The TOS sensors 21a, 21b may be of a type similar to that of the engine speed sensors 22a, 22b. Clutch pressure sensors 23a, 23b are also provided in connection with the transmissions 20a, 20b. Clutch pressure sensors 23a, 23b can be pressure transducers in the hydraulic circuit(s) associated with the clutches of the transmissions 20a, 20b. Trolling valves 25a, 25b are also provided for each marine propulsion device 14a, 14b, and will be described further herein below.

The marine propulsion system 10 also includes a control module 28 in signal communication with the engines 16a, 16b and the transmissions 20a, 20b, as well as their associated sensors and valves and other components noted herein below. The control module 28 may also be configured to control the flow of power between components in the marine vessel 12. Among these components is a power source 90, which in certain embodiments includes batteries 91 and/or other energy storage systems in a manner known in the art. The power source 90 of certain embodiments also includes power management and protection circuitry, such as that discussed in the U.S. patents referenced in the Background section, for example. It will also be recognized that portions of the entirety of the power source 90 may also be combined with or include at least portions of the control module 28 or other components shown in FIG. 1, for example.

In the exemplary embodiment of FIG. 1, an alternator 27 provided with the marine propulsion devices 14a, 14b generates power via rotation of the engines 16a, 16b in a manner known in the art. These alternators 27 generate and provide power to the power source 90, such as to charge the batteries 91 or aid in powering any power consuming devices connected thereto.

The control module 28 is programmable and includes a processor and a memory. The control module 28 can be located anywhere in the marine propulsion system 10 and/or located remote from the marine propulsion system 10 and can communicate with various components of the marine vessel 12 via a peripheral interface and wired and/or wireless links, as will be explained further herein below. Although FIG. 1 shows one control module 28, the marine propulsion system 10 can include more than one control module. Portions of the method disclosed herein below can be carried out by a single control module or by several separate control modules. For example, the marine propulsion system 10 can have control modules located at or near a helm 32 of the marine vessel 12 and can also have control module(s) located at or near the marine propulsion devices 14a, 14b. If more than one control module is provided, each can control operation of a specific device or sub-system on the marine vessel.

In some examples, the control module 28 may include a computing system that includes a processing system, storage system, software, and input/output (I/O) interfaces for communicating with peripheral devices. The systems may be implemented in hardware and/or software that carries out a programmed set of instructions. As used herein, the term "control module" may refer to, be part of, or include an application specific integrated circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip (SoC). A control module may include memory (shared, dedicated, or group) that stores code executed by the processing system. The term "code" may include software, firmware, and/or microcode, and may refer to programs, routines, functions, classes, and/or objects. The term "shared" means that some or all code from multiple control modules may be executed using a single (shared) processor. In addition, some or all code from multiple control modules may be stored by a single (shared) memory. The term "group" means that some or all code from a single control module may be executed using a group of processors. In addition, some or all code from a single control module may be stored using a group of memories.

The control module 28 communicates with one or more components of the marine propulsion system 10 via the I/O interfaces and a communication link, which can be a wired or wireless link. In one example, the communication link is a controller area network (CAN) bus, but other types of links could be used. It should be noted that the extent of connections of the communication link shown herein is for schematic purposes only, and the communication link in fact provides communication between the control module 28 and each of the peripheral devices noted herein, although not every connection is shown in the drawing for purposes of clarity.

Figure 2:
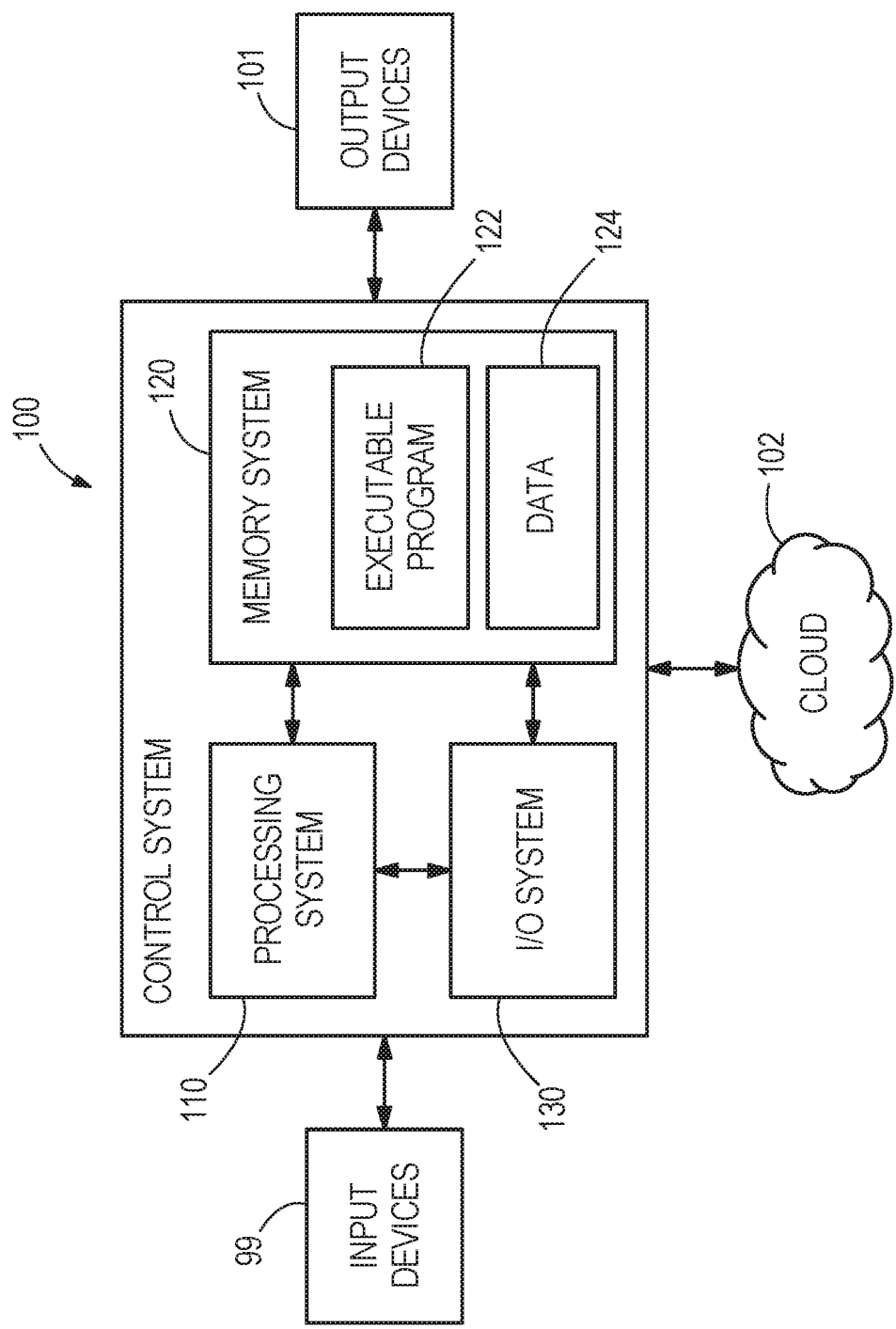
FIG. 2 depicts an exemplary control system such as may be incorporated within the marine vessel of FIG. 1.

An exemplary control system 100 is shown in FIG. 2, which can be used as the control module 28 discussed above. Certain aspects of the present disclosure are described or depicted as functional and/or logical block components or processing steps, which may be performed by any number of hardware, software, and/or firmware components configured to perform the specified functions. For example, certain embodiments employ integrated circuit components, such as memory elements, digital signal processing elements, logic elements, look-up tables, or the like, configured to carry out a variety of functions under the control of one or more processors or other control devices. The connections between functional and logical block components are merely exemplary, which may be direct or indirect, and may follow alternate pathways.

In certain examples, the control system 100 communicates with each of the one or more components of the marine propulsion system 10 via a communication link CL, which can be any wired or wireless link. The control module 100 is capable of receiving information and/or controlling one or more operational characteristics of the marine propulsion system 10 and its various sub-systems by sending and receiving control signals via the communication links CL. In one example, the communication link CL is a controller area network (CAN) bus; however, other types of links could be used. It will be recognized that the extent of connections and the communication links CL may in fact be one or more shared connections, or links, among some or all of the components in the system 1. Moreover, the communication link CL lines are meant only to demonstrate that the various control elements are capable of communicating with one another, and do not represent actual wiring connections between the various elements, nor do they represent the only paths of communication between the elements. Additionally, the marine propulsion system 10 may incorporate various types of communication devices and systems, and thus the illustrated communication links CL may in fact represent various different types of wireless and/or wired data communication systems.

The control system 100 may be a computing system that includes a processing system 110, memory system 120, and input/output (I/O) system 130 for communicating with other devices, such as input devices 99 and output devices 101, either of which may also or alternatively be stored in a cloud 102. The processing system 110 loads and executes an executable program 122 from the memory system 120, accesses data 124 stored within the memory system 120, and directs the marine propulsion system 10 to operate as described in further detail below.

The processing system 110 may be implemented as a single microprocessor or other circuitry, or be distributed across multiple processing devices or sub-systems that cooperate to execute the executable program 122 from the memory system 120. Non-limiting examples of the processing system include general purpose central processing units, application specific processors, and logic devices.

The memory system 120 may comprise any storage media readable by the processing system 110 and capable of storing the executable program 122 and/or data 124. The memory system 120 may be implemented as a single storage device, or be distributed across multiple storage devices or sub-systems that cooperate to store computer readable instructions, data structures, program modules, or other data. The memory system 120 may include volatile and/or non-volatile systems, and may include removable and/or non-removable media implemented in any method or technology for storage of information. The storage media may include non-transitory and/or transitory storage media, including random access memory, read only memory, magnetic discs, optical discs, flash memory, virtual memory, and non-virtual memory, magnetic storage devices, or any other medium which can be used to store information and be accessed by an instruction execution system, for example.

Returning to FIG. 1, the marine propulsion system 10 also includes a global positioning system (GPS) 30 that provides location and speed of the marine vessel 12 to the control module 28. Additionally or alternatively, a vessel speed sensor such as a Pitot tube or a paddle wheel could be provided. The marine propulsion system 10 may also include an inertial measurement unit (IMU) or an attitude and heading reference system (AHRS) 26. An IMU has a solid state, rate gyro electronic compass that indicates the vessel heading and solid state accelerometers and angular rate sensors that sense the vessel's attitude and rate of turn. An AHRS provides 3D orientation of the marine vessel 12 by integrating gyroscopic measurements, accelerometer data, and magnetometer data. The IMU/AHRS could be GPS-enabled, in which case a separate GPS 30 would not be required.

Further, the marine propulsion system 10 includes a number of operator input devices located at the helm 32 of the marine vessel 12. The operator input devices include a multi-functional display device 34 including a user interface 36. The user interface 36 may be an interactive, touch-capable display screen, a keypad, a display screen and keypad combination, a track ball and display screen combination, or any other type of user interface known to those having ordinary skill in the art for communicating with a multi-functional display device 34. A joystick 38 is also provided at the helm 32 and allows an operator of the marine vessel 12 to command the marine vessel 12 to translate or rotate in any number of directions. A steering wheel 40 is provided for providing steering commands to the marine propulsion devices 14a, 14b or to a rudder, in the event that the marine propulsion devices are not steerable. A throttle lever 42 is also provided for providing thrust commands, including both a magnitude and a direction of thrust, to the control module 28. Here, two throttle levers are shown, each of which can be used to control one of the marine propulsion devices 14*a* or 14*b*, although the two levers can be controlled together as a single lever. Alternatively, a single lever could be provided for controlling both marine propulsion devices 14*a*, 14*b*.

Several of the operator input devices at the helm 32 can be used to input an operator demand on the engines 16*a*, 16*b* to the control module 28, including the user interface 36 of the multi-functional display device 34, the joystick 38, and the throttle lever 42. By way of example, a rotation of the throttle lever 42 in a forward direction away from its neutral, detent position could be interpreted as a value from 0% to 100% operator demand corresponding via an input/output map, such as a look up table, to a position of the throttle valves of the engines 16*a*, 16*b*. For example, the input/output map might dictate that the throttle valves are fully closed when the throttle lever 42 is in the forward, detent position (i.e., 0% demand), and are fully open when the throttle lever 42 is pushed forward to its furthest extent (i.e., 100% demand).

The inventors have recognized problems with power systems presently known in the art, and particularly understanding, managing, and controlling the power consumption by various devices. While the present disclosure generally discusses power systems used in conjunction with marine vessels, it would be recognized that the presently disclosed systems and methods also apply to other systems in which a limited amount of power is available for powering devices, such as in the context of recreational vehicles, electric vehicles, and/or the like.

In many such power systems, energy is provided to devices via one or more batteries (also referred to as a battery bank) and/or capacitor-based energy storage system when a generator or main source of power is not in use or available. Exemplary generators may be external generators 93 (FIG. 1) and/or an engine and alternator, as discussed above. Similarly, a main source of power may be the engine and alternator discussed above, and/or shore power when a marine vessel is plugged at a dock or marina, for example. To prevent damage to the batteries, some power systems presently known in the art can be programmed to provide for load shedding of various devices to reduce the power consumption of these devices from the batteries.

However, the inventors have identified that these systems are set up for load shedding based only on a state of charge (SOC) or voltage of the batteries, configured manually by the operator, and/or as pre-programmed within the software. These manual settings then provide that individual devices are turned off when a set threshold for the state of charge or battery voltage is achieved (e.g., battery voltage drops below 11.0 VDC), regardless of whether these devices are currently being used by the operator, or anticipated to be used in the near future. For example, if a water heater is set to be turned off when the battery voltage reaches 11.0 VDC, these prior art systems will disable the water heater even if the operator is presently using the shower. This can cause inconvenience or discomfort for the operator, and/or potentially provide for damage or malfunction of other devices that remain operational when related or interacting devices are shut off.

The inventors have developed the presently disclosed systems and methods for automatically and intelligently reducing the power consumption of devices that consume a limited amount of power from a power source, such as the power source 90 of FIG. 1. By way of example, the load shedding system 92 presently disclosed may be configured to automatically reduce the power consumption of such devices 94 as a water heater, shower light, bathroom fan, shower water pump, air conditioning unit, water maker, outdoor accent lighting, outdoor safety lighting, GPS, radio communications, and other devices found within marine vessels, recreational vehicles, and/or other devices incorporating power systems having a limited amount of power known in the art. It will be recognized that reducing the power consumption of the devices 94 includes any decrease, whether incremental or entirely turning off the device 94. The degree of reduction in certain embodiments is further variable, depending on the limited amount of power remaining, which other devices 94 are operating, and/or the like.

Figure 3:
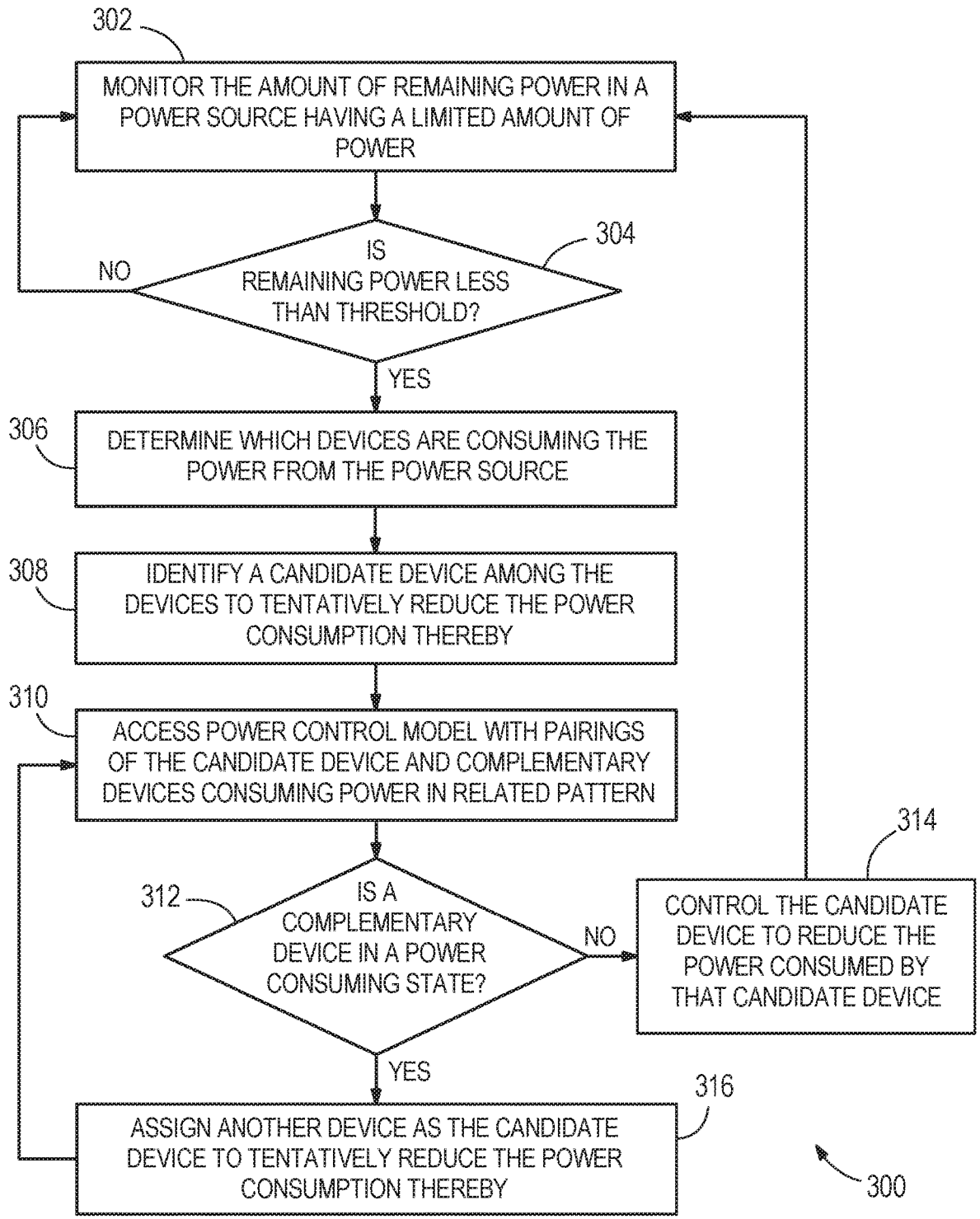
FIG. 3 depicts an exemplary method for automatically reducing the power consumed by devices according to the present disclosure.
Figure 4:
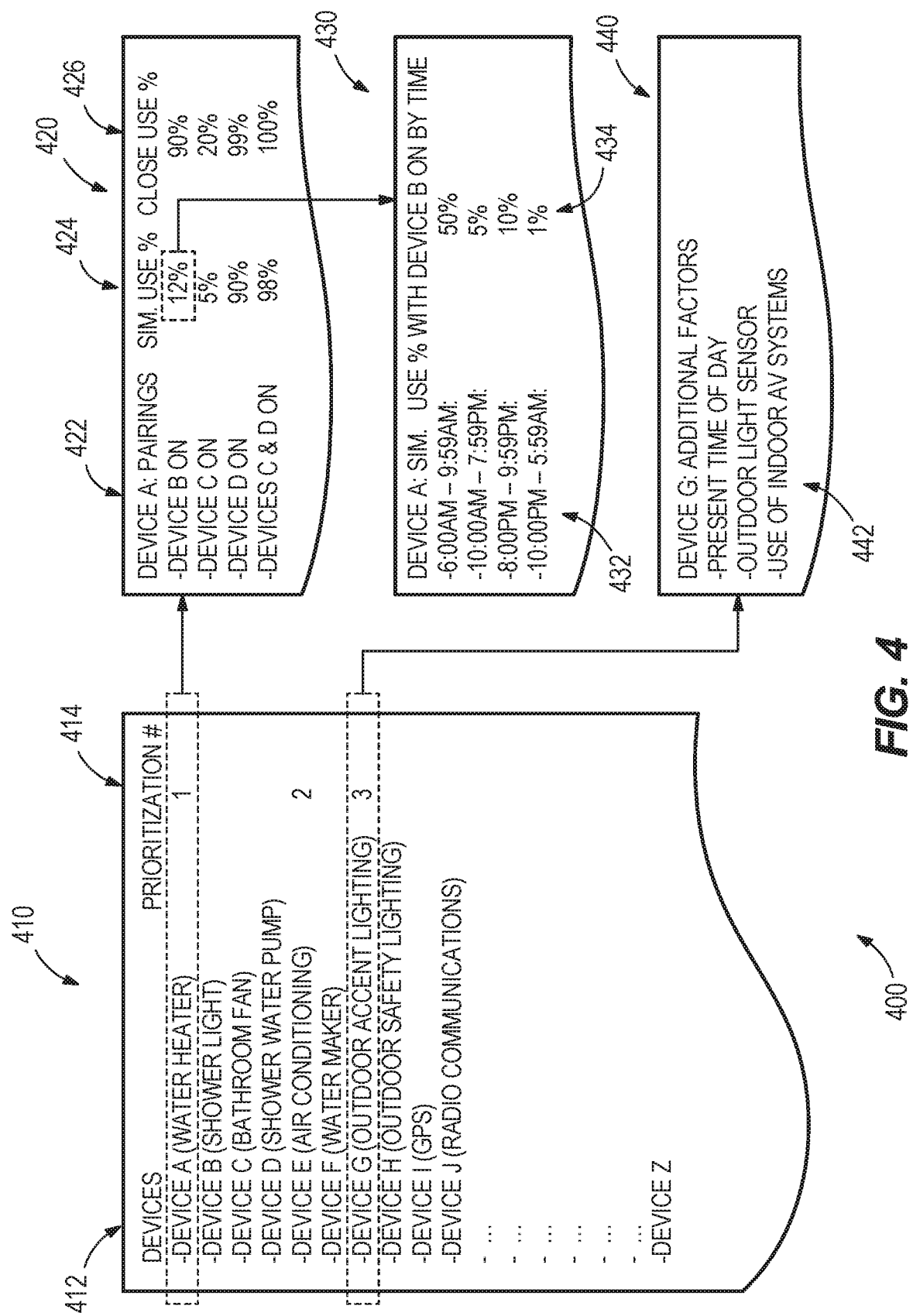
FIG. 4 depicts exemplary data within an exemplary power control model as may be stored and executed in conjunction with the control system of FIG. 2.

FIG. 3 depicts an exemplary method 300 for automatically reducing the power consumption of devices 94 from a power source 90 having a limited or finite amount of power, such as from the batteries 91 discussed above. Reference is also made to an exemplary power control model 400, which is shown in FIG. 4. The method 300 includes monitoring the amount of remaining power in the power source in step 302, which may be conducted in a manner known in the art. Based on this information, it is then determined in step 304 whether the remaining power is less than a threshold, which may be established as a voltage, remaining kilowatt-hours (kWh), and/or the like. In other words, a determination is made in step 304 that load shedding is necessary, and that at least one of the devices 94 should be controlled to reduce the power being consumed to thus preserve the limited amount of power remaining in the power source 90. This determination may also be made via a conventional method known in the art.

It is then determined in step 306 which of the devices 94 are consuming the power from the power source 90, and in certain embodiments how much power each of these devices 94 is drawing. Next, a candidate device 412 (FIG. 4) is identified for tentatively reducing the power consumption its step 308. In certain examples, the candidate device 412 is selected from a list of devices 94 permitted to be controlled for reduced power consumption, and in certain examples further prioritized based on the amount of power consumption as determined in step 306. Other factors may also be considered in the selection of the devices 94 permitted to be reduced, and also in the selection of the specific candidate device being considered within this subset of devices 94. Additional information regarding candidate devices and this prioritization is provided below.

Whereas systems presently known in the art would then immediately and blindly disable this candidate device 412 to eliminate the power consumption thereof, the present method 300 first provides for confirming the impact of reducing the power of this candidate device 412. Specifically, step 310 provides for accessing a power control model 400 stored in memory, whereby the power control model 400 includes pairings of the candidate device 412 with complementary devices that are known or identified as consuming power in a related pattern to each other. For example, the systems presently known in the art may provide for turning off a water heater when the battery state of charge falls below fifteen percent, irrespective of whether the shower is presently in use. In contrast, the power control model 400 of the present disclosure, which is discussed further below, would include a pairing 422 between this candidate device 412 (here the water heater) and complementary devices (such as the shower water pump) to recognize that these devices 94 are frequently used in combination. As will be described further, this allows control of the candidate device 412 to depend upon whether the complementary device is in use, in which case an alternative candidate device may be more suitable for reducing the power consumption at the present moment.

In this manner, step 312 provides for determining whether any of the complementary devices in the pairings 422 corresponding to the candidate device 412 is in a power consuming state. If this determination is found to be affirmative, step 416 provides for assigning another device 94 as the candidate device 412 for tentatively reducing its power consumption, as the previous candidate device has been identified as not being a good option for load shedding at the moment. If alternatively it is determined in step 312 that none of the complementary devices within the pairings 422 in the power control model 400 are presently consuming power, that candidate device 412 may be controlled in step 314 to reduce the power consumed by that candidate device 412. In this manner, the method 300 provides for automatically and intelligently reducing the power consumption on the power source 90. The process may then repeat at step 302 such that additional power consumption may be reduced as necessary.

As stated above, FIG. 4 depicts an exemplary power control model 400 for automatically reducing the power consumption of devices 94 from the power source 90 according to the present disclosure. The power control model 400 may be stored within the data 124 of the memory system 120 shown in FIG. 2, which would be executable by the control system 100 in the manner discussed above. In the embodiment shown, the power control model 400 includes several levels of data for consideration when selecting which of the devices 94 to reduce the power consumption of, and/or to control these devices 94 such that power consumption is thereby reduced.

In the embodiment shown, the power control model 400 includes an ordered prioritization table 410, which lists the devices 412 that may be controlled to reduce the power consumption thereby. In the present example, the prioritization table 410 further includes a prioritization value 414 by which the devices 412 will tentatively be controlled to have reduced power consumption. It will be recognized that the prioritization values 414 are in certain embodiments not static, but vary depending on which devices 94 are in operation, by the charge or remaining power available within the power source 90, by the time of day, the status of an excursion presently under way (e.g., 70% of the way to the destination, 3 hours to destination with unfavorable currents and/or winds of 15 knots, etc.), and/or the like.

FIG. 4 further depicts a subset of information that may be used to generate the prioritizations 414 of the prioritization table 410, such as a statistical use table 420 that shows which devices 94 tend to be used together. In the example shown, device A (a water heater) would be considered a candidate device 412 for tentatively reducing the power consumption thereby. The statistical use table 420 then shows the pairings 422 of the candidate device 412 with other complementary devices known or predicted to be used in conjunction with the candidate device 412 such that the device 94 in the pairings 422 consume the power in a related manner. The complementary devices may be used simultaneously with the candidate device 412, adjacently, such as within a certain time period before or after the candidate device 412 (e.g, within five minutes), or other known or subsequently identified patterns of usage between the complementary devices and the candidate device 412. In the example shown, the statistical use table 420 shows, for device A as the candidate device 412, the likelihood of device A being used when device B is consuming power, when device C is consuming power, when device D is consuming power, and when devices C and D are both consuming power, respectively. These statistical use table 420 figures are shown as simultaneous use data 424, as well as close use data 426 (for example use of device A within ten minutes of device B), based on known or learned power consumption data. In the present example, there is a 90 percent chance of device A being used if device B is presently consuming power.

In some embodiments, the simultaneous use data 424 is further divided by the time of day or other variables, such as shown in the simulated use by time table 430. As shown, the simulated use time data 434 of using device A when device B is determined to be on varies by time range 432, with the highest probability of device A being used when device B is determined to be on being 50 percent between the time range 432 of 6:00 a.m. to 9:59 a.m. In other words, when device B (in the present example a shower light) is determined to be on and the present time is between 6:00 a.m. and 9:59 a.m., there is a 50 percent chance that the water heater (device A) will also have simultaneous use, or in other words be consuming power at the same time. In contrast, the time range 432 between 10:00 p.m. and 5:59 a.m. represents the lowest likelihood of simultaneous use of device A when device B is determined to be on, specifically one percent, for example.

As discussed above, other additional factors may also be incorporated into setting the prioritization for reducing the power consumption of devices 94 as controlled by the power control model 400. For example, the exemplary additional factor table 440 provides for the prioritization of device G (outdoor accent lighting), whereby the additional factors 440 for setting this prioritization include the present time of day, data from an outdoor light sensor (e.g., how bright it is outside), and/or use of an indoor audio/visual (AV) system, for example. In other words, if the load shedding system 92 determines that load shedding is necessary, the prioritization for reducing the power consumption of device G (specifically outdoor accent lighting) may be governed by the time of day or the detected amount of light outside. In this example, disabling the daytime usage of exterior accent lighting while the sun is shining would have no impact on safety, and perhaps not even be noticed or indicate that the operator inadvertently left the outdoor accent lighting on in the first place.

In certain embodiments, general power-saving protocols are implemented to preserve the power remaining in the batteries 91, which may be overridden by the power control method 400 as described above. For example, subject application of the power control method 400, the load shedding system 92 may be configured such that the whenever the water pump is not running, the water heater will be disabled between 12:00 am and 6:00 am. The limitation may alternatively be put in place only when the SOC of the battery 91 is below 50%, for example.

Another example provides that if the lights in a bathroom are off but the ventilation system in the bathroom remains on, the load shedding system 92 will disable the ventilation system after 2 minutes on the assumption that no one is present in the bathroom, and/or that the ventilation system has been accidentally left on.

Another example is to proactively disable the water heater when the water pump, shower light, and ventilation system are all in an off state. In certain examples, this may mean reducing the temperature for maintaining the temperature in the water heater below a normal threshold.

Another example provides that when the water pump is running, the shower lights are on, and the bathroom ventilation system is on, there is a high probability that the water heater will be needed in the near future. In this case, the load shedding system 92 disables the air conditioning compressor to reduce the load on the batteries 91, acknowledging that at least one person is not in a main room being air conditioned.

The functional block diagrams, operational sequences, and flow diagrams provided in the Figures are representative of exemplary architectures, environments, and methodologies for performing novel aspects of the disclosure. While, for purposes of simplicity of explanation, the methodologies included herein may be in the form of a functional diagram, operational sequence, or flow diagram, and may be described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology can alternatively be represented as a series of interrelated states or events, such as in a state diagram. Moreover, not all acts illustrated in a methodology may be required for a novel implementation.

This written description uses examples to disclose the invention, including the best mode, and also to enable any person skilled in the art to make and use the invention. Certain terms have been used for brevity, clarity, and understanding. No unnecessary limitations are to be inferred therefrom beyond the requirement of the prior art because such terms are used for descriptive purposes only and are intended to be broadly construed. The patentable scope of the invention is defined by the claims and may include other examples that occur to those skilled in the art. Such other examples are intended to be within the scope of the claims if they have features or structural elements that do not differ from the literal language of the claims, or if they include equivalent features or structural elements with insubstantial differences from the literal languages of the claims.

What is claimed is:

1. A method for automatically reducing the power consumed by devices from a power source having a limited amount of power, the method comprising:
    determining with a control system which of the devices is consuming the power;
    identifying a candidate device among the devices to tentatively control to reduce the power consumed by the candidate device;
    accessing a power control model, wherein the power control model includes pairings of the candidate device with complementary devices among the devices, wherein the candidate device and the complementary devices in the pairings consume the power in related patterns to each other; and
    controlling the candidate device to reduce the power consumed thereby only when each of the complementary devices in the pairings in the power control model are determined to be in a non-power consuming state.

2. The method according to claim 1, wherein the candidate device is a water heater, and wherein the complementary devices include a water pump for a shower.

3. The method according to claim 1, wherein the candidate device is identified from an ordered prioritization for controlling to reduce the power consumed by the devices, and wherein the candidate device is cycled through the ordered prioritization until the power consumed by the devices is reduced by a threshold amount.

4. The method according to claim 3, wherein the ordered prioritization varies depending upon which of the devices is determined to be consuming power.

5. The method according to claim 1, wherein a first of the pairings for the candidate device includes only a first of the complementary devices, and wherein a second of the pairings for the candidate device includes at least a second of the complementary devices that is distinct from the first of the complementary devices.

6. The method according to claim 1, wherein the related patterns in the power control model include combinations of the devices that consume the power simultaneously.

7. The method according to claim 1, wherein the related patterns in the power control model include an order in which the devices consume the power.

8. The method according to claim 1, wherein the related patterns in the power control model include additional factors other than the power consumed by the devices.

9. The method according to claim 8, wherein the additional factors include a charge rate for the power source.

10. The method according to claim 8, wherein the additional factors include data from one or more sensors.

11. The method according to claim 10, wherein the one or more sensors include a light sensor.

12. The method according to claim 1, wherein the related patterns include preset patterns and learned patterns, wherein the learned patterns are added to the power control model over time based via machine learning.

13. The method according to claim 1, wherein the power control model further includes amounts for reducing the power consumed by the devices.

14. The method according to claim 13, wherein the reduction amounts for one or more of the devices are dynamic.

15. The method according to claim 14, wherein the reduction amounts for the one or more of the devices are based at least in part on a remaining power in the limited amount of the power of the power source.

16. The method according to claim 1, further comprising providing one or more thresholds of a remaining power in the limited amount of power before controlling the candidate device to reduce the power consumed thereby.

17. The method according to claim 1, wherein the devices are determined to be in the non-power consuming state when the power consumed is less than a non-zero threshold.

18. A system for automatically reducing power consumption of devices from a power source having a limited amount of power, the system comprising:
    a memory system storing a power control model;
    a control system configured to:
    determine which of the devices is consuming the power;
    identify a candidate device among the devices to tentatively control to reduce the power consumed by the candidate device;
    access the power control model, wherein the power control model includes pairings of the candidate device with complementary devices among the devices, wherein the candidate device and the complementary device in the pairings consume the power in related patterns to each other; and
    control the candidate device to reduce the power consumed thereby;
    wherein the control system is configured to control the candidate device to reduce the power consumed thereby only when each of the complementary devices in the pairings in the power control model are determined to be off.

19. The system according to claim 18, wherein the candidate device is identified from an ordered prioritization for controlling to reduce the power consumed by the devices, and wherein the device identified as the candidate device cycles through the ordered prioritization until the power consumed by the devices is reduced by a threshold amount.

20. A method for automatically reducing the power consumed by devices from a power source having a limited amount of power, the method comprising:
- (a) determining with a control system which of the devices is consuming the power;
- (b) identifying a candidate device from a candidate list of the devices to tentatively control to reduce the power consumed by the candidate device;
- (c) accessing a power control model, wherein the power control model includes pairings of the candidate device with complementary devices among the devices, wherein the candidate device and the complementary device in the pairings consume the power in related patterns to each other, and wherein the related patterns in the power control model include combinations of the devices that consume the power simultaneously;
- (d) controlling the candidate device to reduce the power consumed thereby only when each of the complementary devices in the pairings in the power control model are determined to be in a non-power consuming state; and
- (e) assigning another of the devices on the candidate list as the candidate device and repeating steps (a-e) until the all of the devices on the candidate list have been assigned as the candidate device.

\* \* \* \* \*